United States Patent [19]

Michelson

[11] Patent Number: 5,765,349
[45] Date of Patent: Jun. 16, 1998

[54] TREE SHAKER

[76] Inventor: Yigal Michelson, 3 Hashkedim, 37000 Pardes Hanna, Israel

[21] Appl. No.: 627,198

[22] Filed: Apr. 3, 1996

[51] Int. Cl.⁶ .................................................. A01D 46/00
[52] U.S. Cl. ............................... 56/328.1; 56/340.1
[58] Field of Search ............................ 56/340.1, 328.1; 460/148, 139

[56] References Cited

U.S. PATENT DOCUMENTS

| | | | |
|---|---|---|---|
| 3,338,040 | 8/1967 | Shipley et al. | 56/340.1 |
| 3,460,329 | 8/1969 | Overstree, Jr. | 56/340.1 |
| 4,893,459 | 1/1990 | Orlando | 56/328.1 X |
| 4,903,471 | 2/1990 | Bunnelle | 56/340.1 |

*Primary Examiner*—Terry Lee Melius
*Assistant Examiner*—Heather Shackelford

*Attorney, Agent, or Firm*—Mark M. Friedman

[57] ABSTRACT

A tree shaker comprising a construction having a front end engaging two arms for gripping a tree; a first shaft having a first weight is rotatably engaged by the construction and is rotated by a first motor a first weight connected to or integrally formed with the first shaft; a second shaft having a second weight is rotatably engaged by the construction and is rotated by a second motor, the first and second shafts being coaxial such that one of them is internally located relative to the other; a stopping mechanism is connected to one of the weights for restricting the relative orientation of the weights to a maximum of 180° one relative to the other and to a minimum of a close contact between one another; wherein; when the first motor is operative the second motor is idle and the weights are at their minimum relative orientation for producing a vibration of the construction, whereas when the second motor is operative the first motor is idle and the weights are at their maximum relative orientation for terminating the vibration of the construction.

16 Claims, 3 Drawing Sheets

TREE SHAKER

FIELD AND BACKGROUND OF THE INVENTION

The present invention relates in general to a tree shaker. More particularly, the present invention relates to a tree shaker capable of quick switching between a shaking mode and a steady mode and which can be adjusted to grip tree trunks or limbs having variable diameters and orientations of growth for maximal vibration energy transfer.

Tree shakers are commonly used to harvest olive trees and various nut trees such as almond, pistachio, pecan, walnut, macadamia and the like, as well as soft fruit trees, which fruits are not intended for the fresh fruits market, such as for example peaches, apricot, apples, citrus, etc., used for example as raw materials in the preservatives industry.

Tree shaking practice is well accepted since the early 60s'. Most known tree shakers include a motor rotating a central shaft, to which shaft connected is an unbalanced weight rotating therewith, thereby creating a vibration which vibrates the shaker. Such shakers further include arms for closely gripping a tree trunk or limb, through which arms thus formed vibration is transferred from the shaker to the tree trunk or limb.

The process of harvesting a plant of trees using a tree shaker of the type described above includes (i) approaching the shaker to a first tree to be harvested and engaging the trunk or limb of the tree with the arms of the tree shaker; (ii) starting the motor to achieve vibration; (iii) silencing the motor to stop vibration; (iv) approaching the shaker to another tree to be harvested and engaging its trunk or limb with the arms; and (v) repeating steps (i)–(iv) until all desired trees are harvested.

Such a process has a number of drawbacks. First, the motor of the tree shaker is alternately started/silenced, which shortens its life span. Second, since shaking is based on sudden vibration of the fruit, aimed at disconnecting the fruit from the tree, much power is required to spin the weight connected to the central shaft from stationary position to full rotation in a short period of time, therefore according to the above process a great amount of energy is wasted while reoperating the motor. And finally, thus starting/silencing the motor awaiting full vibration or complete silence to be achieved is time consuming.

Furthermore, while harvesting a tree using a tree shaker, a close contact should be formed between the shaker aims and the tree on one hand, yet on the other hand, precaution should be exercised not to harm the tree. To this end arms of conventional shakers are typically equipped with a soft padding. Nevertheless, the soft padding adsorb a considerable fraction of the vibration energy, rendering the harvesting process less effective.

There is thus a widely recognized need for, and it would be highly advantageous to have, a tree shaker capable of quick switching between a shaking mode and a steady mode and which can be adjusted to grip tree trunks or limbs having variable diameters and orientations of growth for maximal vibration energy transfer.

SUMMARY OF THE INVENTION

According to the present invention there is provided a tree shaker capable of quick switching between a vibration mode and a steady mode and which can be adjusted to grip tree trunks or limbs having variable diameter and orientation of growth for maximal vibration energy transfer.

According to further features in preferred embodiments of the invention described below, the tree shaker comprising (a) a construction having a front end and a rear end; (b) two arms being implemented at the front end of the construction, the two arms being for gripping the tree, each of the two arms having a far end; (c) a first shaft being rotatably engaged by the construction; (d) a first motor for rotating the first shaft; (e) a first weight connected to or integrally formed with the first shaft; (f) a second shaft being rotatably engaged by the construction, the first and second shafts being coaxial such that one of the first and second shafts is internally located relative to the other; (g) a second motor for rotating the second shaft; (h) a second weight connected to or integrally formed with the second shaft, the first and second weights having relative orientations; and (i) a stopping mechanism connected to or integrally formed with one of the first and second weights for restricting the relative orientation of the first and second weights to a maximum of 180° one relative to the other and to a minimum of a close contact between one another; wherein, when the first motor is operative the second motor is idle and the first and second weights are at the minimum relative orientation for producing a vibration of the construction, whereas when the second motor is operative the first motor is idle and the first and second weights are at the maximum relative orientation for terminating the vibration of the construction.

According to still further features in the described preferred embodiments the rear end of the construction includes connecting means for connecting the construction to a transporting vehicle.

According to still further features in the described preferred embodiments each of the two arms includes a hydraulic mechanism for gripping/ungripping the tree.

According to still further features in the described preferred embodiments the tree shaker further comprising a switching mechanism for controlling the operation of the first and second motors.

According to still further features in the described preferred embodiments each of the first and second motors is a hydraulic motor.

According to still further features in the described preferred embodiments the first shaft is internal relative to the second shaft, and the stopping mechanism is connected to or integrally formed with the first weight.

According to still further features in the described preferred embodiments the second shaft is internal relative to the first shaft, and the stopping mechanism is connected to or integrally formed with the second weight.

According to still further features in the described preferred embodiments each of the rotations of the first and second shafts is effected by a belt transmission.

According to still further features in the described preferred embodiments the tree shaker further comprising a front tree holder, the front tree holder being hingedly connected at the front end of the construction between the two arms via a first horizontal hinge for permitting a vertical adjustment of the front tree holder relative to the tree.

According to still further features in the described preferred embodiments each of the two arms includes a side tree holder, the side tree holders are hingedly connected to connectors located at the far ends of the arms via second horizontal hinges for permitting a vertical adjustment of the side tree holders relative to the tree, the connectors are hingedly connected to the far ends of the arms via vertical hinges for permitting a horizontal adjustment of the side tree holders relative to the tree.

According to still further features in the described preferred embodiments each of the side tree holders and the front tree holder are formed with a curved surface for accommodating the tree, the surfaces are covered with a tuff padding.

The present invention successfully addresses the shortcomings of the presently known configurations by providing a tree shaker which can be used to harvest fruits from trees in an efficient manner since the tree shaker of the present invention is capable of quick switching between a shaking operation mode and a steady operation mode and can be adjusted to grip tree trunks or limbs having variable diameter and orientation of growth for maximal vibration energy transfer.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a tree shaker which can be used to harvest fruits from trees. Specifically, the present invention can be used to harvest fruits in an efficient manner since the tree shaker of the present invention is capable of quick switching between a shaking mode and a steady mode and can be adjusted to grip tree trunks or limbs having variable diameters and orientations of growth for maximal vibration energy transfer.

The principles and operation of a tree shaker according to the present invention may be better understood with reference to the drawings and accompanying descriptions.

Figure 1:
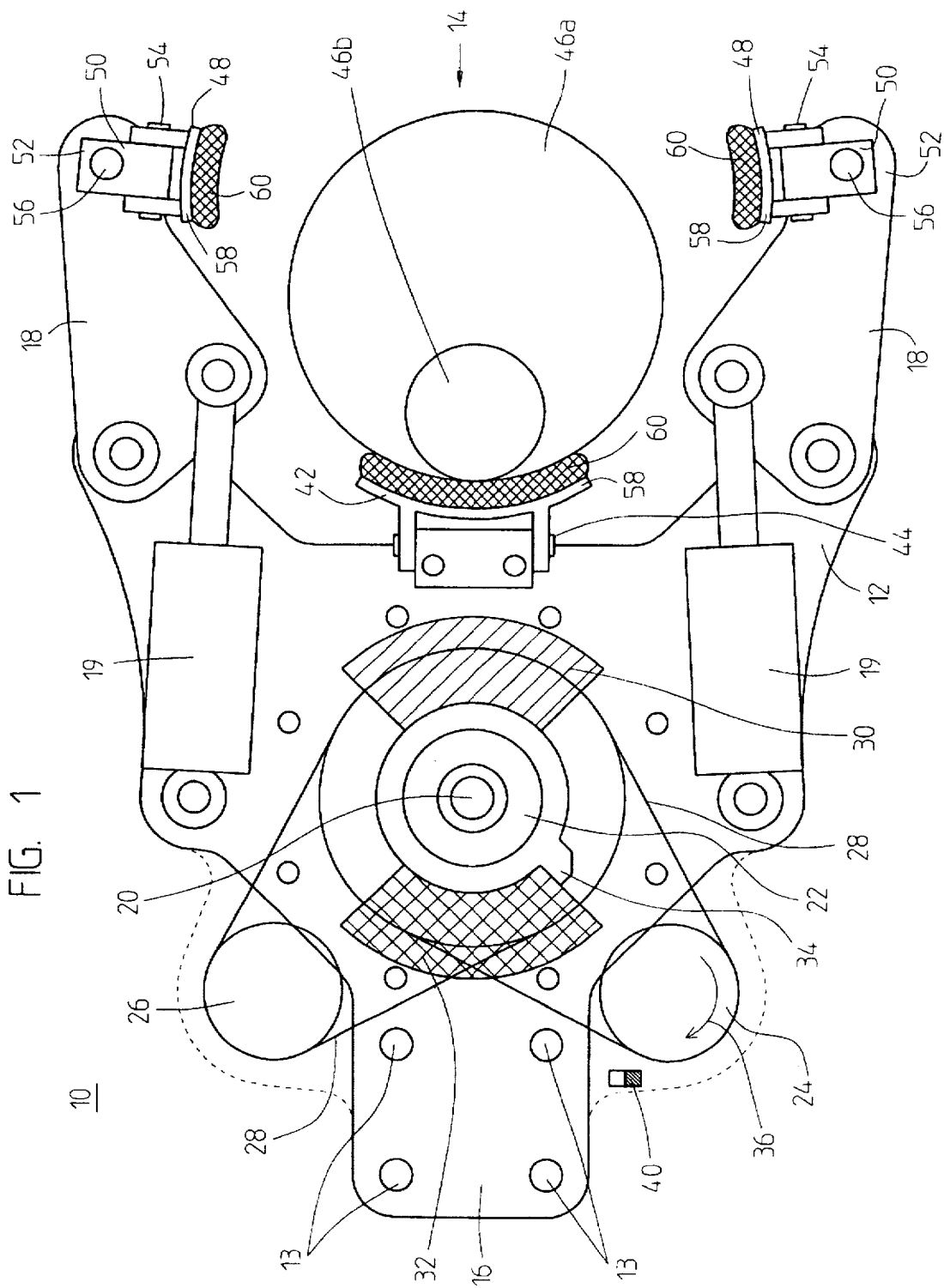
FIG. 1 is a top view of a tree shaker according to the present invention in its steady operation mode.
Figure 2:
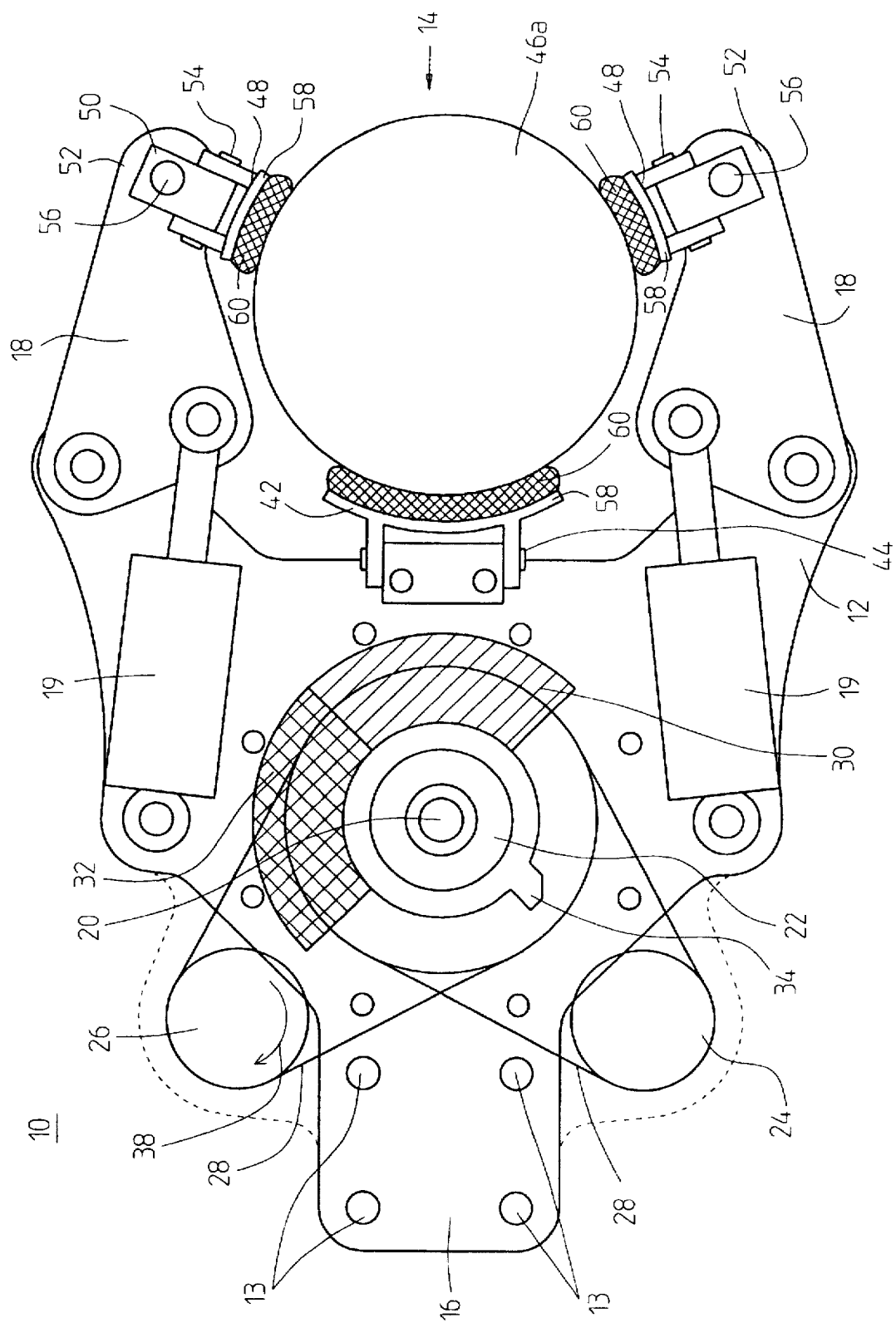
FIG. 2 is a top view of the tree shaker according to the present invention in its shaking operation mode.
Figure 3:
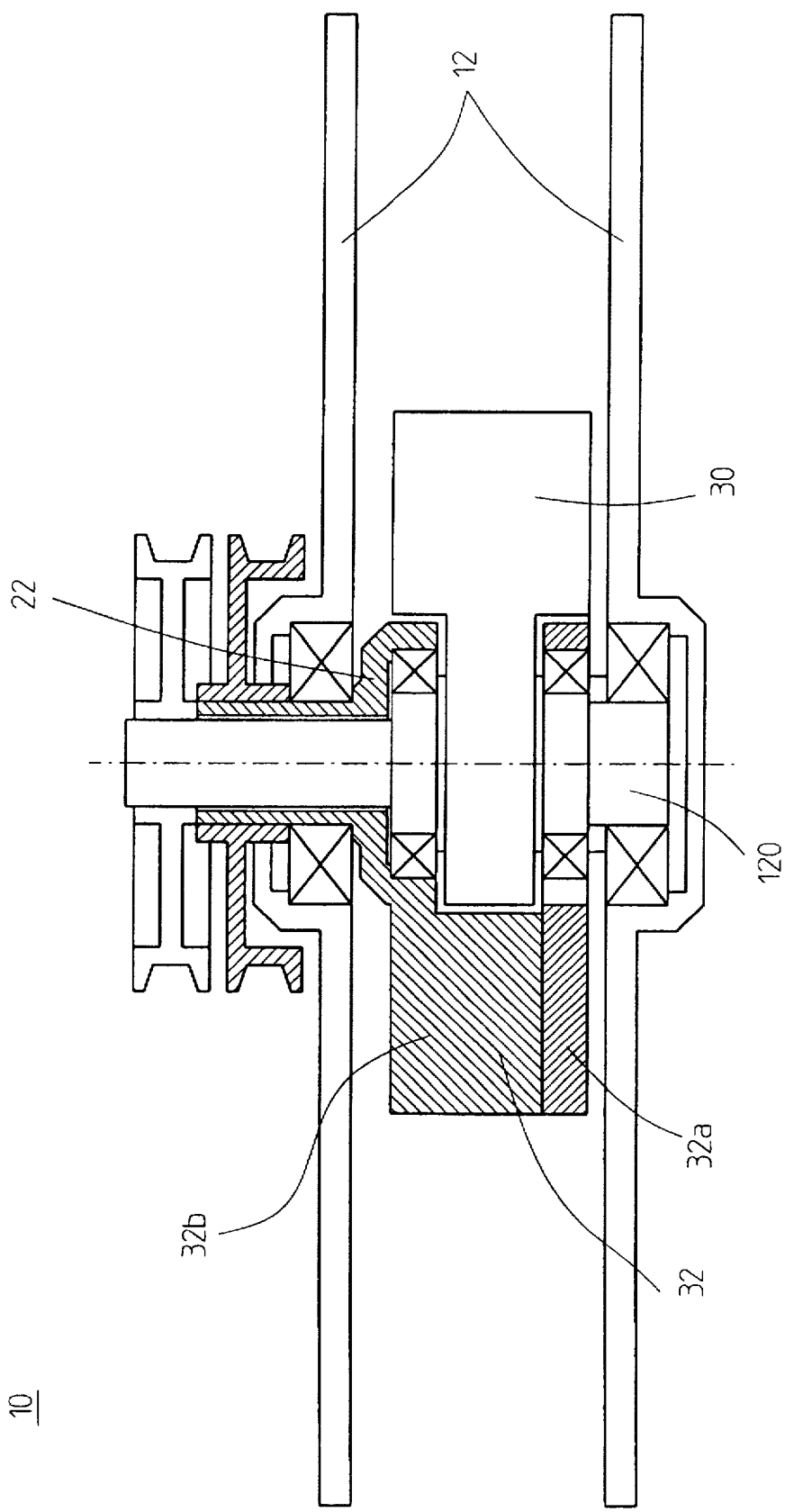
FIG. 3 is a is a cross section view through the shafts and weights of the tree shaker of the present invention in its steady operation mode.

Referring now to the drawings, FIGS. 1-3 illustrate an example of the inventive tree shaker referred to hereinbelow as tree shaker 10. Thus, tree shaker 10 includes a construction 12 which has a front end 14 and a rear end 16. Preferably, rear end 16 of construction 12 includes connecting means 13 for connecting said construction to a transporting vehicle such as a tractor or the like. In the example of FIGS. 1 and 2, connecting means 13 are in the form of nuts accepting holes, yet as will be appreciated by one ordinarily skilled in the art, connecting means 13 may acquire various other forms.

Tree shaker 10 further includes two arms 18 being implemented at front end 14 of construction 12, arms 18 are used for gripping a tree 46 whose fruits are harvested. In a preferred embodiment each of arms 18 includes a hydraulic mechanism 19 for gripping/ungripping tree trunks or limbs having variable diameters as indicated by 46a and 46b in FIG. 1.

Tree shaker 10 further includes a first shaft 20 and a second shaft 22 each is rotatably engaged by construction 12. As best seen in FIG. 3, first 20 and second 22 shafts are coaxial (i.e., concentric) such that one of the shafts, say 20, is internally located relative to the other, say 22. As shown in FIGS. 1-2, each of shafts 20 and 22 is rotated by corresponding first 24 and second 26 motors, respectively, preferably by a belt transmission as indicated by 28. To each of first 20 and second 22 shafts, connected to or integrally formed with is a first weight 30 and a second weight 32, respectively. Weights 30 and 32 have a similar, preferably identical weight and shape. Connected to or integrally formed with one of first 30 and second 32 weights, say 30, is a stopping mechanism 34. As shown in FIG. 3, in a preferred embodiment second weight is constructed from at least two fixedly connected parts 32a and 32b facilitating the assembly of tree shaker 10.

Tree shaker 10 has a steady and a shaking modes of operation, actuated alternately when harvesting fruits from trees in a plant. FIG. 1 shows the steady mode of tree shaker 10. While shaker 10 is in its steady mode, weights 30 and 32 are arranged at 180° one relative to the other, thereby, although both shafts 20 and 22 are rotated, as is explained below in greater detail, no vibration is imposed on construction 12.

Consider the configuration presented in the Figures wherein first shaft 20 is coaxial and internal relative to second shaft 22, and stopping mechanism 34 is connected to or integrally formed with first weight 30. When first motor 24 is actively operated, as indicated in FIG. 1 by arrow 36, first shaft 20 is rotated via corresponding belt transmission 28 and first weight 30 and stopping mechanism 34 rotate therewith. As a result, of the construction of stopping mechanism 34 and its rotation, second weight 32 is forced to rotated, itself rotating second shaft 22, itself rotating second motor 26 which is presently idle (i.e., not operated).

Since the rotation of second weight 32 is imposed by the rotation of stopping mechanism 34 and not by its corresponding motor 26, second weight 32 resists this imposed rotation and therefore is forced against stopping mechanism 34. In turn, the relative orientation of first 30 and second 32 weights is kept at 180° one relative to the other and no vibration is imposed on construction 12.

FIG. 2 shows the shaking mode of operation of tree shaker 10. While shaker 10 is in its shaking mode, weights 30 and 32 are arranged such that a close contact is formed between them, thereby, due to the asymmetric weight distribution, vibration is imposed on construction 12.

Again, consider the configuration presented in the Figures wherein first shaft 20 is coaxial and internal relative to second shaft 22, and stopping mechanism 34 is connected to or integrally formed with first weight 30. When second motor 26 is actively operated, as indicated in FIG. 2 by arrow 38, second shaft 22 is rotated via corresponding belt transmission 28 and second weight 32 rotate therewith. Within a brief period of time (e.g., seconds or less), second weight 32 becomes in close contact with first weight 30 forcing it to rotate therewith although first motor 24 is presently idle.

Since the rotation of first weight 30 is imposed by the rotation of second weight 32 and not by its corresponding motor 24, first weight 30 resists this imposed rotation and therefore is forced against second weight 32. In turn, the relative orientation of first 30 and second 32 weights is maintained asymmetrically at close contact to one another and a vibration is imposed on construction 12.

Thus, according to the configuration presented in the Figures wherein first shaft 20 is coaxial and internal relative to second shaft 22, and stopping mechanism 34 is connected to or integrally formed with first weight 30, by actively operating only first motor 24 while second motor 26 is idle, all the components of the described mechanical system rotate, yet no vibration is imposed on construction 12, whereas by actively operating second motor 26, again all the components of the described mechanical system rotate, yet vibration is imposed on construction 12.

It will be appreciated by one ordinarily skilled in the art, that in a different configuration, wherein second shaft 22 is coaxial and internal relative to first shaft 20, and stopping mechanism 34 is connected to or integrally formed with second weight 32, similar steady and shaking operation modes can be obtained (not shown).

Thus, in a preferred embodiment, tree shaker 10 further includes a switching mechanism 40 for controlling the operation of first 24 and second 26 motors. Motors 24 and 26 are preferably hydraulic motors. In this case switching mechanism 40 is controlling the flow of the hydraulic fluid to first 24 and second 26 motors.

As shown in FIGS. 1 and 2, in yet another preferred embodiment, tree shaker 10 further includes a front tree holder 42 which is hingedly connected at front end 14 of construction 12 between arms 18 via a first horizontal hinge 44. Horizontal hinge 44 is for permitting a free vertical adjustment of front tree holder 42 relative to tree 46.

Preferably, each of arms 18 includes a side tree holder 48. Each of holders 48 is hingedly connected to a connector 50 located at the far end 52 of each of arms 18 via second horizontal hinges 54 for permitting a free vertical adjustment of side tree holders 48 relative to tree 46. Connectors 50 are hingedly connected 15 to far ends 52 of arms 18 via vertical hinges 56 for permitting a free horizontal adjustment of side tree holders 48 relative to tree 46.

In a preferred embodiment front holder 42 and side holders 48 have a curved surface suitable for accommodating tree 46, which surface 58 is covered by a tuff padding 60 made for example from a tuff rubber.

Front tree holder 42 and side tree holders 48, collectively form a three points grip, as compared with a two points grip characterizing prior art tree shakers, to enable a maximal distributed contact area between tree shaker 10 and tree 46, for better transmission of vibration energy to tree 46.

Permitting the free vertical and horizontal adjustments of front tree holder 42 and side tree holders 48 as described above, enables arms 18 to better grip trees having irregularities, trees having trunks which are not vertical, etc., for a more effective transmission of vibration from construction 12, through arms 18 and onto the fruits of tree 46. Enabling these adjustments further permits use of tuff padding which adsorb less of the vibration energy as compared with the soft padding used in prior art tree shakers.

The operation of tree shaker 10 according to its preferred embodiments is as follows. While arriving at a working zone in a plant of trees for example, a user operates tree shaker 10 in its steady mode of operation, e.g., uses switching mechanism 40 to operate only first motor 24 as described hereinabove, while second motor 26 is idle. The user then selects a first tree to be harvested and positions shaker 10 such that the trunk of the tree is located between arms 18 of shaker 10, as shown in FIG. 1. Then, the user operates hydraulic arms 18 such 10 that the tree is firmly engaged among holders 42 and 48, as shown in FIG. 2. As described above, holders 42 and 48 are used to better fit the tree especially in cases where the tree is characterized by crookedness or other irregularities and therefore to enable an efficient transmission of vibration energy from tree holder 10 to the tree. At this point, after the user has ensured that the tree is firmly engaged among holders 42 and 48, the user, by using switching mechanism 40, operates second motor 26 and turn first motor 24 idle to actuate vibration. When the tree is fully harvested and the user wishes to harvest a second tree, he re-switches the operation of shaker 10 back to the steady mode by re-selecting first motor 24 operative and second motor 26 idle, using switching mechanism 40, he then operates hydraulic arms 18 such that they are opened as shown in FIG. 1, he then repositions shaker 10 such that the trunk of the second tree is located between arms 18 and then he follows the procedure described above for the first tree.

It will be appreciated that in contradistinction to the prior art tree shakers briefly described in the background section, the speed of switching between the steady and shaking modes of the tree shaker of the present invention is exceptionally fast (e.g., within seconds or less), whereas the prior art shakers are slowly changing between their operative shaking mode and their non-operative (i.e., silent) steady mode.

It will be further appreciated that both motors and all other relevant components (shafts, weights, stopping mechanism and belts) of the shaker according to the present invention constantly rotate at equal speeds regardless whether a steady or shaking modes are selected. Therefore, a minimal amount of energy is required at changing between the modes, which is done simply by selecting one motor actively rotating and the other idle and passively rotating, or vice versa. The process of changing modes is therefore fast as well.

On the other hand, the process of activating vibration in the prior art shakers is energy wasteful and time consuming since the machine is operated from start each time. Also the deactivation of vibration in the prior art shakers is time consuming since relatively long time elapses between deactivation of the motor until the machine is completely still.

It will be further appreciated that the motors of the tree shaker of the present invention are expected to have prolonged life span since, they do not change operation speed to the extent characterizing motors implemented in the prior art shakers.

While the invention has been described with respect to a limited number of embodiments, it will be appreciated that many variations, modifications and other applications of the invention may be made.

What is claimed is:

1. A tree shaker for harvesting a tree comprising:
   (a) a construction having a front end and a rear end;
   (b) two arms being implemented at said front end of said construction, said two arms being for gripping the tree, each of said two arms having a far end;
   (c) a first shaft being rotatably engaged by said construction;
   (d) a first motor for rotating said first shaft;
   (e) a first weight connected to or integrally formed with said first shaft;
   (f) a second shaft being rotatably engaged by said construction, said first and second shafts being coaxial, such that one of said first and second shafts is internally located relative to the other;
   (g) a second motor for rotating said second shaft;
   (h) a second weight connected to or integrally formed with said second shaft, said first and second weights having relative orientations; and
   (i) a stopping mechanism connected to or integrally formed with one of said first and second weights for restricting said relative orientation of said first and second weights to a maximum of 180° one relative to the other and to a minimum of a close contact between one another;

wherein, when said first motor is operative said second motor is idle and said first and second weights are at said minimum relative orientation for producing a vibration of said construction, whereas when said second motor is operative said first motor is idle and said first and second weights are at said maximum relative orientation for terminating said vibration of said construction.

2. A tree shaker as in claim 1, wherein said rear end of said construction includes connecting means for connecting said construction to a transporting vehicle.

3. A tree shaker as in claim 1, wherein each of said two arms includes a hydraulic mechanism for gripping/ungripping the tree.

4. A tree shaker as in claim 1, further comprising a switching mechanism for controlling said operation of said first and second motors.

5. A tree shaker as in claim 1, wherein each of said first and second motors is a hydraulic motor.

6. A tree shaker as in claim 1, wherein said first shaft is internal relative to said second shaft, and said stopping mechanism is connected to or integrally formed with said first weight.

7. A tree shaker as in claim 1, wherein said second shaft is internal relative to said first shaft, and said stopping mechanism is connected to or integrally formed with said second weight.

8. A tree shaker as in claim 1, wherein each of said rotations of said first and second shafts is effected by a belt transmission.

9. A tree shaker as in claim 1, further comprising a front tree holder, said front tree holder being hingedly connected at said front end of said construction between said two arms via a first horizontal hinge for permitting a vertical adjustment of said front tree holder relative to the tree.

10. A tree shaker as in claim 9, wherein said front tree holder is formed with a curved surface for accommodating the tree, said surfaces is covered with a tuff padding.

11. A tree shaker as in claim 1, wherein each of said two arms includes a side tree holder, said side tree holders are hingedly connected to connectors located at said far ends of said arms via second horizontal hinges for permitting a vertical adjustment of said side tree holders relative to the tree, said connectors are hingedly connected to said far ends of said arms via vertical hinges for permitting a horizontal adjustment of said side tree holders relative to the tree.

12. A tree shaker as in claim 11, wherein each of said side tree holders are formed with a curved surface for accommodating the tree, said surfaces are covered with a tuff padding.

13. A tree shaker for harvesting a tree comprising:
  (a) a construction having a front end and two arms being implemented at said front end of said construction, said two arms being for gripping the tree, each of said two arms having a far end, wherein each of said two arms includes a side tree holder, said side tree holders are hingedly connected to connectors located at said far ends of said arms via horizontal hinges for permitting a vertical adjustment of said side tree holders relative to the tree, said connectors are hingedly connected to said far ends of said arms via vertical hinges for permitting a horizontal adjustment of said side tree holders relative to the tree and
  (b) a front tree holder being hingedly connected at said front of said construction between said two arms via a first horizontal hinge for permitting vertical adjustment of said front tree holder relative to the tree.

14. A tree shaker as in claim 13, wherein each of said two arms includes a hydraulic mechanism for gripping/ungripping the tree.

15. A tree shaker as in claim 13, wherein each of said side tree holders are formed with a curved surface for accommodating the tree, said surfaces are covered with a tuff padding.

16. A tree shaker as in claim 13, wherein each of said side tree holders and said front tree holder are formed with a curved surface for accommodating the tree, said surfaces are covered with a tuff padding.

* * * * *